United States Patent
Lee et al.

(10) Patent No.: US 9,369,192 B1
(45) Date of Patent: Jun. 14, 2016

(54) HYBRID BEAMFORMING ARCHITECTURE

(71) Applicant: MARVELL INTERNATIONAL LTD., Hamilton (BM)

(72) Inventors: Ying-Cheng Lee, Santa Clara, CA (US); Timothy J. Donovan, Livermore, CA (US); Dharmesh C. Bhagatwala, Cupertino, CA (US); Ken Kinwah Ho, San Jose, CA (US); Hongyuan Zhang, Fremont, CA (US); Rohit U. Nabar, Sunnyvale, CA (US); Tsunglun Yu, Cupertino, CA (US)

(73) Assignee: MARVELL INTERNATIONAL LTD. (BM)

(*) Notice: Subject to any disclaimer, the term of this patent is extended or adjusted under 35 U.S.C. 154(b) by 0 days.

(21) Appl. No.: 14/524,272

(22) Filed: Oct. 27, 2014

Related U.S. Application Data (63) Continuation of application No. 13/285,188, filed on Oct. 31, 2011, now Pat. No. 8,873,484.

(60) Provisional application No. 61/409,853, filed on Nov. 3, 2010, provisional application No. 61/409,858, filed on Nov. 30, 2010, provisional application No. 61/409,870, filed on Nov. 30, 2010.

(51) Int. Cl.
*H04W 84/04* (2009.01)
*H04B 7/06* (2006.01)
*H04B 7/04* (2006.01)

(52) U.S. Cl.
CPC ............ *H04B 7/0617* (2013.01); *H04B 7/046* (2013.01); *H04B 7/0634* (2013.01)

(58) Field of Classification Search
CPC combination set(s) only.
See application file for complete search history.

(56) References Cited

U.S. PATENT DOCUMENTS

| | | | | |
|---|---|---|---|---|
| 7,570,210 B1 * | 8/2009 | Nabar | | H01Q 3/267 342/373 |
| 7,847,732 B1 * | 12/2010 | Nabar | | H01Q 3/267 342/373 |
| 7,916,807 B2 * | 3/2011 | Aldana | | H04B 7/0691 375/299 |
| 8,095,097 B1 * | 1/2012 | Nabar | | H04W 72/085 370/338 |
| 8,155,597 B2 * | 4/2012 | Nabar | | H04L 25/0206 455/101 |
| 8,295,263 B1 * | 10/2012 | Chen | | H04L 1/16 370/345 |
| 8,335,167 B1 * | 12/2012 | Zhang | | H04B 7/0626 370/252 |
| 8,543,063 B2 * | 9/2013 | Bergel | | H04B 7/0617 455/114.2 |
| 8,873,484 B1 * | 10/2014 | Lee | | H04B 7/0617 370/329 |

(Continued)

*Primary Examiner* — Fan Ng (57) ABSTRACT

Systems, methods, and other embodiments associated with a hybrid beamforming architecture are described. According to one embodiment, a first wireless device includes a transmitter and a baseband beamforming processing unit. The baseband beamforming processing unit includes a steering matrix calculation unit and a steering matrix cache. The steering matrix calculation unit is configured to derive a steering matrix from channel related information in a first packet received from a second wireless device. The steering matrix includes weights. The steering matrix cache is configured to (i) store the steering matrix derived from the channel related information, and (ii) provide the weights from the steering matrix to the transmitter. The transmitter is configured to, based on the weights from the steering matrix, perform transmit beamforming on a second packet being transmitted to the second wireless device from the first wireless device.

20 Claims, 9 Drawing Sheets

(56) References Cited

U.S. PATENT DOCUMENTS

| | | | | |
|---|---|---|---|---|
| 2004/0204108 A1* | 10/2004 | Etkin | ............... | H04W 16/28 455/562.1 |
| 2008/0005219 A1* | 1/2008 | Nabar | ............... | H04L 25/0206 709/201 |
| 2008/0187060 A1* | 8/2008 | Park | ............... | H04B 7/0452 375/260 |
| 2009/0046594 A1* | 2/2009 | Zhou | ............... | H04B 7/0452 370/252 |
| 2009/0207765 A1* | 8/2009 | Yamaura | ............... | H04B 7/0417 370/310 |
| 2010/0246494 A1* | 9/2010 | Sanayei | ............... | H04B 7/0417 370/328 |
| 2012/0281781 A1* | 11/2012 | Xiao | ............... | H04B 7/024 375/267 |

\* cited by examiner

HYBRID BEAMFORMING ARCHITECTURE

CROSS REFERENCE TO RELATED APPLICATIONS

This patent disclosure is a continuation of U.S. application Ser. No. 13/285,188 filed on Oct. 31, 2011, now U.S. Pat. No. 8,873,484 which claims priority under 35 U.S.C. §119(e) to U.S. Provisional Application Ser. Nos. 61/409,853; 61/409,858 and 61/409,870 all filed on Nov. 3, 2010.

BACKGROUND

The background description provided herein is for the purpose of generally presenting the context of the disclosure. Work of the presently named inventor(s), to the extent the work is described in this background section, as well as aspects of the description that may not otherwise qualify as prior art at the time of filing, are neither expressly nor impliedly admitted as prior art against the present disclosure.

Multiple Input Multiple Output (MIMO) systems in wireless communications leverage aspects of intersymbol interference to potentially increase the bandwidth efficiency of existing spectra. In wireless communication, radio waves do not propagate in a straight line between the transmitter and receiver, but rather bounce and scatter randomly off objects in the environment. This scattering, known as multipath, results in multiple copies of the transmitted signal arriving at the receiver via different scatter paths. MIMO leverages multipath to enhance transmission accuracy and allow multiple signals to be broadcast at the same frequency. This is done by treating the multiple scatter paths as separate parallel sub channels, each capable of bearing distinct data.

MIMO operates by splitting a discrete outbound signal into multiple substreams using an array of transmitter antennas to simultaneously launch the parallel substreams. In Orthogonal Frequency Division Multiplexing (OFDM), the outbound signal is de-multiplexed into a number of parallel spatial data streams or multiple copies of the outbound signal may be concurrently transmitted by the antennas in the same frequency band. All of the spatial data streams are transmitted in the same frequency band, so spectrum is efficiently utilized. Another array of antennas in the receiving device is used to pick up the multiple transmitted spatial streams and their scattered signals.

Each receive antenna picks up all of the incident transmitted spatial streams superimposed as observed components of the received signal vector, not separately. However, the multiple spatial streams are all scattered slightly differently, since the multiple spatial streams respectively originate from different transmit antennas located at different points in space. These scattering differences allow the spatial streams to be identified and recovered from the observed components of the received signal vector. MIMO in combination with OFDM constitutes the basis for many wireless communication standards, such as IEEE802.11n. Beamforming significantly improves the performance of MIMO-OFDM by spatially separating the transmitted data streams. With transmit beamforming, weights are applied to the transmitted signal to improve reception. The weights for each spatial stream, typically expressed as a steering matrix, are derived from channel state information (CSI) for each spatial stream.

Beamforming depends on weighting transmitted data streams according to the steering matrix. Calculating the steering matrix depends on having channel state information (CSI). Therefore, the channel needs to be sounded between two devices to measure the CSI. During sounding, device A transmits a packet to device B. Device B estimates the CSI from the Long Training Frame (LTF) in the packet preamble. One difficulty is that a poor channel between the devices may only support a single spatial stream prior to transmit beamforming, but the channel may support many spatial data streams with transmit beamforming. In a normal packet, the preamble contains information in the LTF for each spatial stream. Thus, if device A transmits a single stream packet to device B, the packet will only have information for one spatial stream. The full dimensionality of the channel is equivalent to the number of transmit antennas at device A and the number of receive antennas at device B. With information for only one spatial stream in the LTF, the CSI for only one spatial stream can be estimated. This limitation is addressed in wireless communication standard IEEE 802.11n.

IEEE 802.11n specifies the manner in which the CSI is communicated between devices. There are two approaches to channel sounding in the 802.11n standard, sounding using a null packet and sounding by way of Extension LTFs. The channel information in the LTF in the null packet preamble covers the full dimensionality of the channel. This type of packet contains no data, therefore there is no issue with a poor channel. In Extension LTF, the packet includes data, however, extra information in the LTF is included beyond that necessary for channel estimation of the data. The extra information in the LTF can be used to measure the full dimensionality of the channel (e.g., derive the CSI for each spatial stream).

Once the channel is sounded, channel information is fed back to the device that will be applying the steering matrix to beamform transmissions. 802.11n specifies two methods of feeding back the channel information: implicit feedback and explicit feedback. Implicit feedback is based on an assumption of reciprocity of the channel in both directions. Therefore, the CSI measured at either end of the channel is considered to be equivalent at the other end. The exchange of feedback and beamforming with implicit feedback per 802.11n is performed as follows. A device B sends a sounding packet (either a null packet or an extended LTF packet) to device A. Device A estimates the CSI from the LTF in the sounding packet. Device A computes the steering matrix from the estimated CSI. Then device A applies the weights in the steering matrix to the next transmission to device B.

With explicit feedback, the device performing the transmit beamforming is the same device as the device that transmits the sounding packet. Device A transmits a sounding packet to device B. Device B estimates the CSI from the LTF in the packet. Then device B transmits the estimated CSI or, in some cases, a steering matrix, to device A. Device A applies beamforming weights to the next transmission to device B.

While conventional Access Points (APs) are capable of beamforming, most conventional APs support only a single type of beamforming. However, APs serve many different types of wireless devices, which may not explicitly support beamforming or employ different types of beamforming methods.

SUMMARY

In one embodiment a first wireless device includes a transmitter and a baseband beamforming processing unit. The baseband beamforming processing unit includes a steering matrix calculation unit and a steering matrix cache. The steering matrix calculation unit is configured to derive a steering matrix from channel related information in a first packet received from a second wireless device. The steering matrix includes weights. The steering matrix cache is configured to (i) store the steering matrix derived from the channel related information, and (ii) provide the weights from the steering matrix to the transmitter. The transmitter is configured to, based on the weights from the steering matrix, perform transmit beamforming on a second packet being transmitted to the second wireless device from the first wireless device.

In another embodiment, a method includes deriving a steering matrix from channel related information in a first packet received from a first wireless device; storing the steering matrix derived from the channel related information; and providing the weights from the steering matrix to a transmitter performing transmit beamforming on a second packet being transmitted to the first wireless device.

In another embodiment, an apparatus includes a transmitter, a steering matrix calculation unit and a steering matrix cache. The steering matrix calculation unit is configured to derive a steering matrix from channel related information in a first packet received from a wireless device. The steering matrix includes weights. The steering matrix cache is configured to (i) store the steering matrix derived from the channel related information, and (ii) provide the weights from the steering matrix to a transmitter. The transmitter is configured to, based on the weights from the steering matrix, perform transmit beamforming on a second packet being transmitted to the wireless device.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

DETAILED DESCRIPTION

Described herein are example systems, methods, and other embodiments associated with a beamforming architecture that supports beamforming between devices using multiple beamforming protocols. The beamforming architecture selects a beamforming mode to be used to process channel related information for transmit beamforming to a given wireless device. The selection of beamforming mode is based, at least in part, on a packet received from the wireless device. The beamforming architecture is configured to process channel related information in the packet according to the determined mode.

For the purposes of this discussion, three beamforming modes are defined: beamformee mode, beamformer mode, and a combination beamformee and beamformer mode. A device that incorporates the beamforming architecture may act in any of these modes and in fact may act in different modes at the different times depending on the particular wireless devices with which it is communicating. In beamformee mode, the architecture receives a packet having a preamble that includes an LTF or other channel information and uses the LTF to determine CSI and the steering matrix. In beamformer mode, the architecture provides weights from a steering matrix that are used for beamforming to a transmitter. In the combination mode, the same device receives the packet with the LTF, derives the steering matrix, and provides the weights to a transmitter for beamforming.

Figure 1:
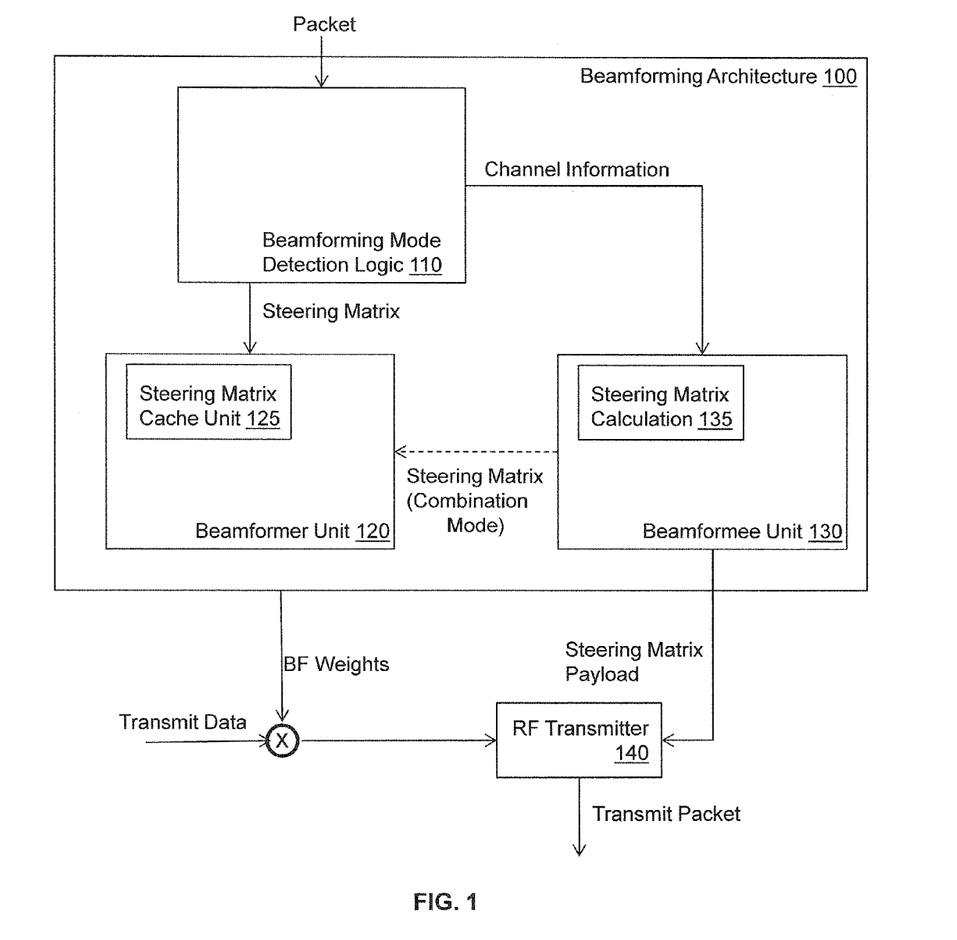
FIG. 1 illustrates one embodiment of an apparatus associated with a hybrid beamforming architecture.

With reference to FIG. 1, one embodiment of a hybrid beamforming architecture 100 is shown. The hybrid beamforming architecture 100 may be a component of a wireless local area network (WLAN) system on a chip (SoC) that processes RF signals from an RF receiver having multiple antennas (not shown) and provides beamformed RF signals to an RF transmitter having multiple antennas (not shown). The hybrid beamforming architecture 100 is capable of acting as a beamformee, beamformer, or both, and is capable of processing channel information that is provided to the architecture either explicitly or implicitly. In some embodiments, the architecture also supports beamforming in which the steering matrix is computed by a processor external to the architecture 100 (see FIG. 3d).

The hybrid beamforming architecture 100 includes a beamforming mode detection logic 110 that determines a beamforming mode in which the architecture 100 should process an incoming packet. For example, if a preamble of a packet indicates that the packet is a sounding packet, the beamforming mode detection logic 110 will select a beamformee mode, meaning that the architecture calculates a steering matrix and transmits the steering matrix to the device that sent the sounding packet. If the packet includes a steering matrix, the architecture selects beamformer mode, meaning that the architecture stores the steering matrix and beamforms subsequent transmissions to the device that sent the steering matrix. If the packet includes channel information, such as a LTF, the beamforming mode detection logic will select the combination mode, meaning that the architecture will both calculate the steering matrix and beamform subsequent packets to the device that sent the packet.

The hybrid beamforming architecture 100 also includes a beamformer unit 120 that is configured to provide weights from a stored steering matrix to a data stream transmitted by an RF transmitter 140. The beamformer unit 120 includes a steering matrix cache unit 125. The steering matrix cache unit 125 is configured to store a steering matrix for each device to which the hybrid beamforming architecture 100 provides beamformed transmissions. The steering matrix cache unit 125, which is discussed in more detail with reference to FIGS. 4 and 5, includes features that allow for rapid application of a received steering matrix to a packet that is subsequently to be transmitted from the RF transmitter 140. Depending on the mode in which the hybrid beamforming architecture 100 is operating, the beamformer unit 120 may be capable of applying the steering matrix to a next packet that is to be transmitted to the device that provided the steering matrix. The beamformer unit 120 may be capable of applying a calculated steering matrix to a subsequent packet that is to be immediately transmitted to the device that provided channel related information.

The hybrid beamforming architecture 100 also includes a beamformee unit 130 that calculates a steering matrix from channel related information (e.g., a LTF) in the packet. The beamformee unit 130 includes a steering matrix calculation logic 135 that is configured to calculate a steering matrix or channel state information from the channel related information in the packet.

Figure 2:
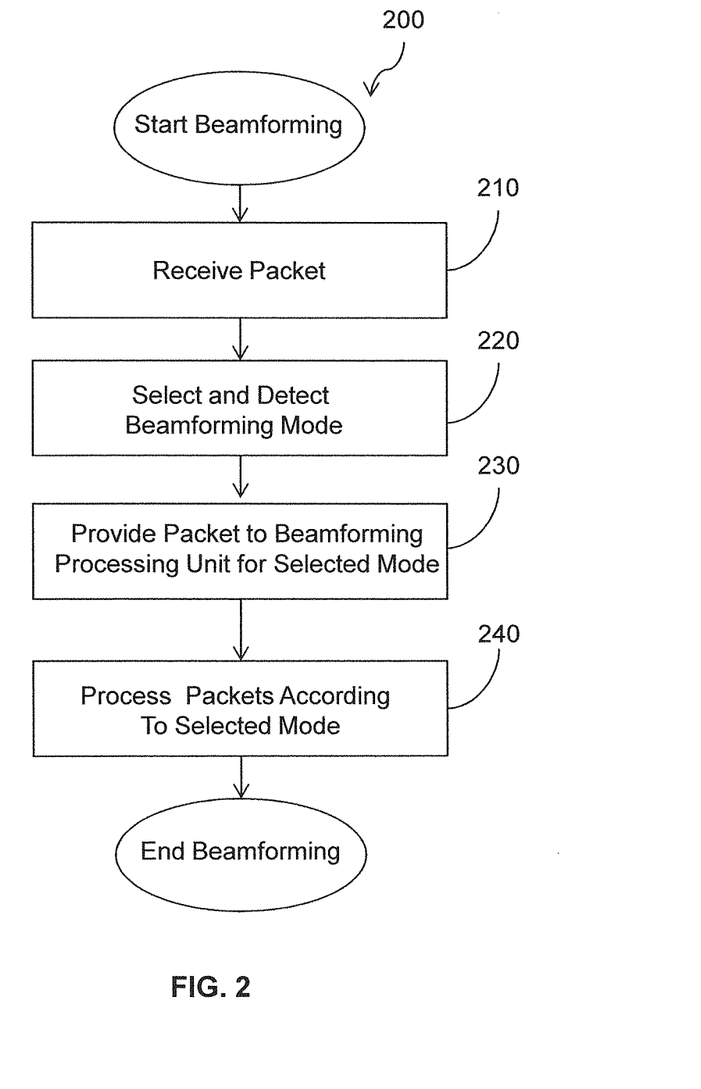
FIG. 2 illustrates one embodiment of a method associated with a hybrid beamforming architecture.

FIG. 2 illustrates one embodiment of a beamforming method 200. At 210, the method includes receiving a packet from a wireless device. At 220, the method includes selecting a beamforming mode based, at least in part, on the packet received from the wireless device. At 230, at least a portion of the packet is provided to a beamforming processing unit associated with the selected beamforming mode. At 240, the method includes processing the provided at least a portion of the packet to enable beamforming of subsequent packets.

For example, with reference back to FIG. 1, when the beamforming mode detection logic 110 selects the beamformer mode, the beamforming mode detection logic 110 provides the steering matrix in the incoming packet to the beamformer unit 120, which stores the steering matrix in the steering matrix cache and provides beamforming weights for weighting a transmit data packet. When the beamforming mode detection logic 110 selects the beamformee mode, the beamforming mode detection logic 110 provides the channel related information in the packet to the beamformee unit 130, which calculates the steering matrix using the steering matrix calculation logic 135 and provides the steering matrix as a payload in a packet to be transmitted.

When the beamforming mode detection logic 110 selects the combination mode, the beamforming mode detection logic 110 sends the channel related information in the packet to the beamformer unit 130, which calculates and provides the steering matrix to the beamformer unit 120. The beamformer unit 120 stores the steering matrix 125 in the steering matrix cache unit 125 and provides beamforming weights for weighting a data packet to be transmitted via the RF transmitter 140.

FIGS. 3*a*-3*e* illustrate one embodiment of a hybrid beamforming architecture 300 operating in various beamforming modes. The path taken by the data in each mode is shown in bold. The hybrid beamforming architecture 300 includes a MAC unit 310 and a baseband unit 350. The MAC unit 310 and baseband unit 350 may be components on a wireless LAN SoC. As illustrated in FIGS. 3*a*-3*e*, an RF packet from a given wireless device is received by the baseband unit 350 and an RF packet is transmitted to the given wireless device. The RF packet illustrated as being output by the hybrid beamforming architecture 300 in FIGS. 3*a*-3*e* is the next RF packet being transmitted to the given wireless device, but not necessarily the next RF packet that is transmitted by the hybrid beamforming architecture 300. This is because the hybrid beamforming architecture 300 may be part of an Access Point (AP) for multiple wireless devices and there may be intervening packets to the other devices that are not illustrated.

Figure 3A:
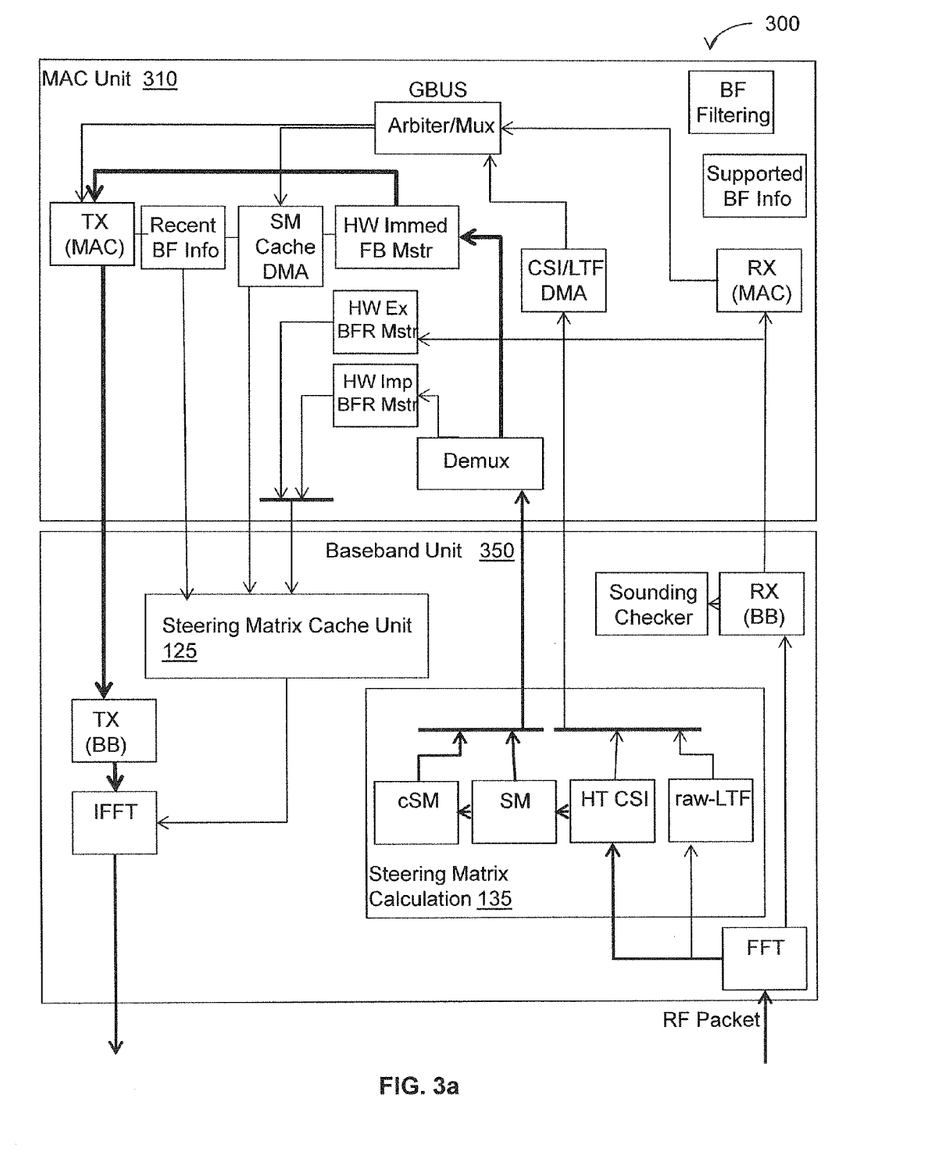
FIGS. 3a-3e illustrate one embodiment of an apparatus associated with hybrid beamforming architecture in various modes of operation.

FIG. 3*a* illustrates one embodiment of the hybrid beamforming architecture operating 300 in a beamformee mode in which the hybrid beamforming architecture 300 receives the channel information explicitly, as part of a sounding packet sent according to IEEE 802.11n. The sounding packet includes the full dimension impulse response of the channel. According to the standard, the hybrid beamforming architecture 300 is to respond with a packet that includes the steering matrix as payload. After conversion to the frequency domain, the channel information in the sounding packet is provided to the steering matrix calculation logic 135. Within the steering matrix calculation logic, the channel information passes to a High Throughput Channel State Information (HT CSI) unit that computes CSI information needed to compute a steering matrix. The CSI information is provided to a steering matrix (SM) unit that computes the steering matrix.

After calculation of the steering matrix within the baseband unit, the steering matrix is provided to a de-multiplexer that is part of the MAC unit 310. The de-multiplexer decodes the steering matrix for transmission to the wireless device. In some embodiments, the steering matrix is compressed with a compression engine (cSM) prior to being sent to the de-multiplexer. A hardware mode immediate feedback master control unit (HW Immed FB Mstr) controls routing of the calculated steering matrix to a MAC unit transmitter and a corresponding baseband transmitter. The hardware mode immediate feedback master control unit is designated "hardware mode" because the steering matrix is being calculated by components in the baseband unit 350 rather than by an external processor running software to calculate the steering matrix (see FIG. 3*d*).

Figure 3B:
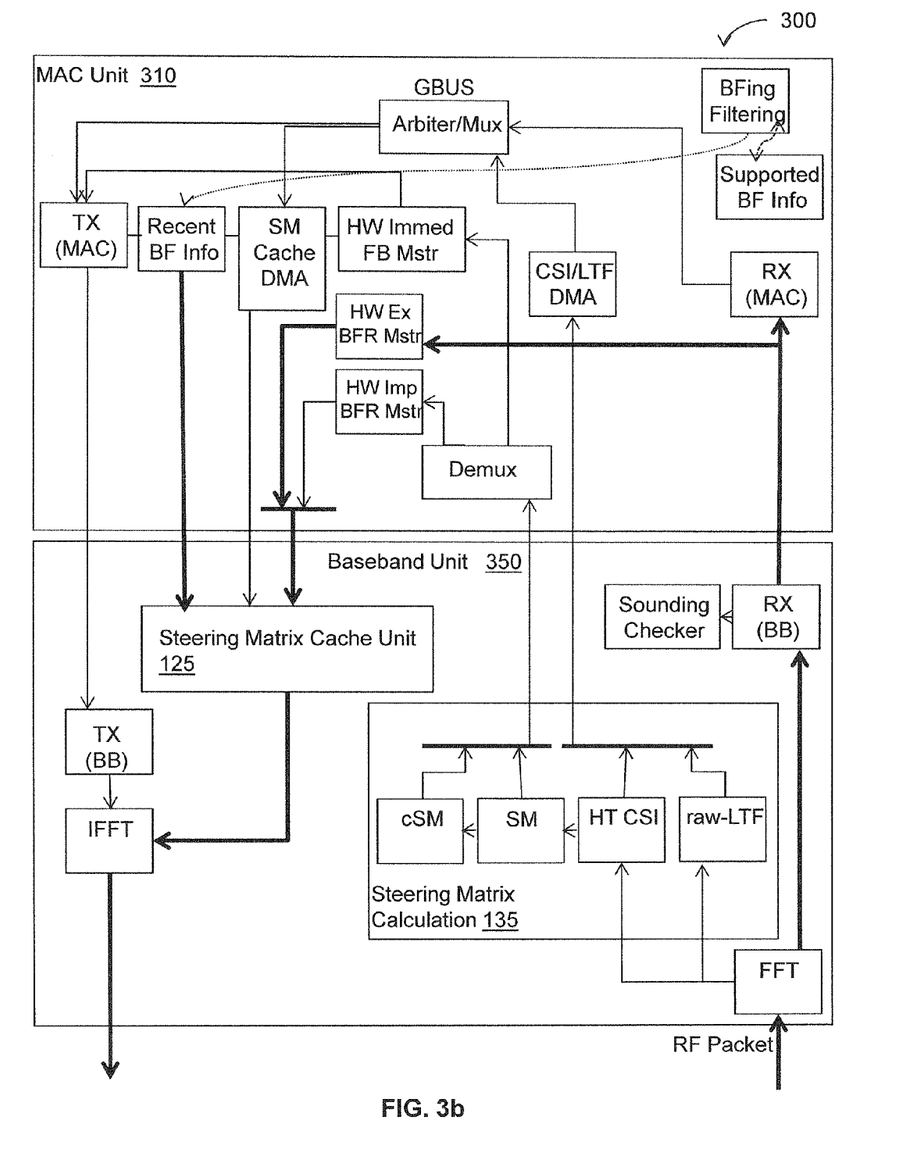

FIG. 3*b* illustrates one embodiment of the hybrid beamforming architecture operating 300 in a beamformer mode in which the hybrid beamforming architecture 300 receives the steering matrix explicitly in the packet's payload, in response to a sounding packet sent by the hybrid beamforming architecture 300 to a wireless device according to IEEE 802.11n. Because the steering matrix does not need to be calculated, the steering matrix calculation logic 135 is bypassed and the steering matrix is provided to a baseband receiver and corresponding MAC unit receiver. The steering matrix is routed to a hardware mode explicit feedback master control unit (HW Ex BFR Mstr) that controls routing of the steering matrix to the steering matrix cache unit 125. If the feedback payload contains CSI, rather than a steering matrix, the hybrid beamforming architecture 300 may act as a beamformer using software to derive the steering matrix (see FIG. 3*e*).

The hardware mode explicit feedback master control unit accesses beamforming filtering information that is used to determine whether the wireless device that transmitted the sounding packet is registered as approved for beamforming operations with the hybrid beamforming architecture 300. The filtering information includes a supported beamforming information table (Supported BF Info) that lists registered wireless devices. In one embodiment, the supported beamforming information table lists potential beamformee/beamformer clients and registers wireless devices that are validated for beamforming. If the wireless device that sent the sounding packet is not registered, the MAC unit will not provide the steering matrix to the steering matrix cache unit 125. If the wireless device that sent the sounding packet is registered, the MAC unit 310 will provide the steering matrix to the steering matrix cache unit 125 for beamforming of future packets to the wireless device.

The MAC unit 310 also retrieves additional beamforming related information associated with the wireless devices that are presently engaged in beamforming with the architecture 300 that is stored in a recent beamforming information table (Recent BF Info). The beamforming related information is provided to the steering matrix cache unit 125 for use in weighting a transmitted packet.

Figure 3C:
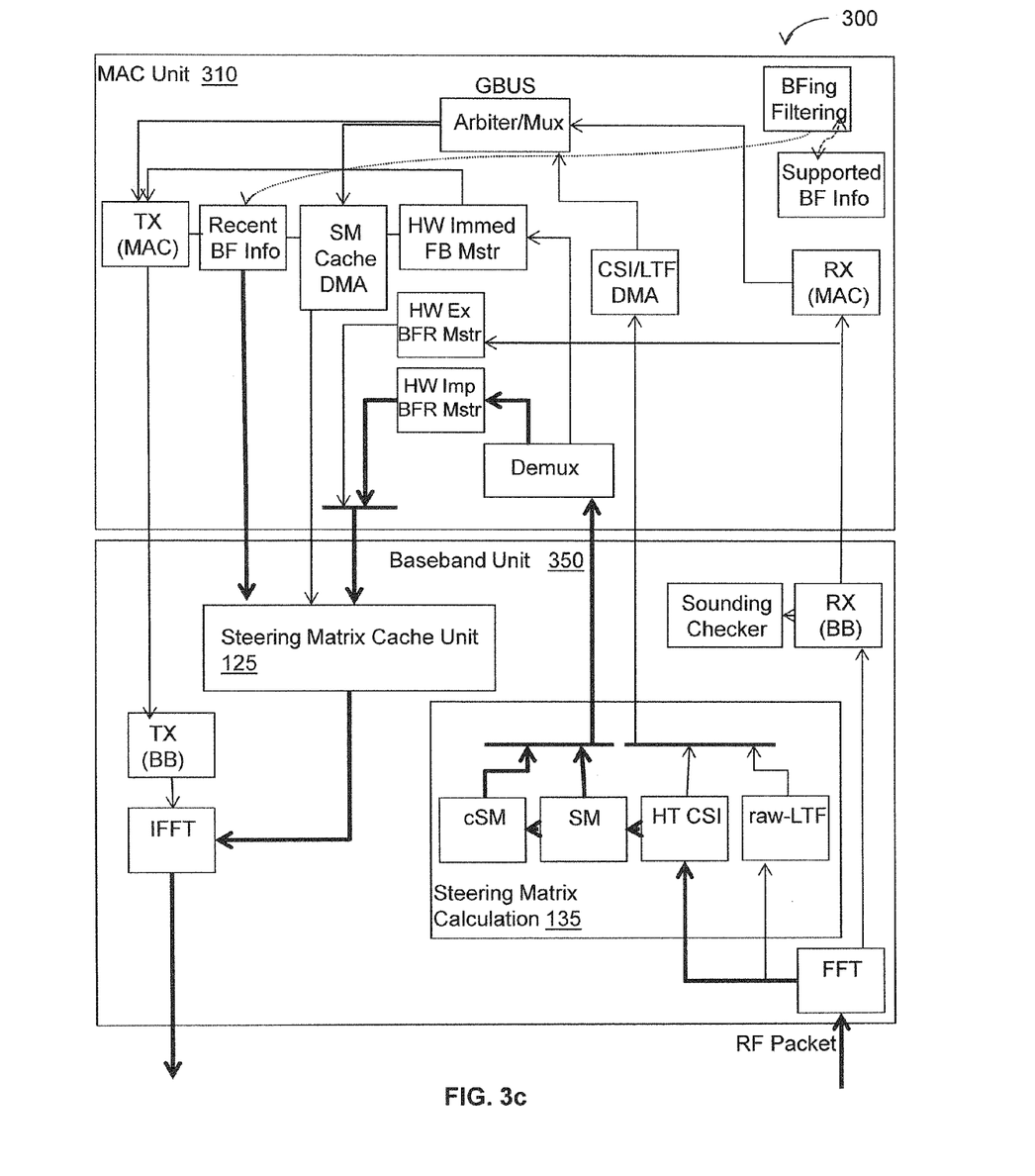
Figure 3D:
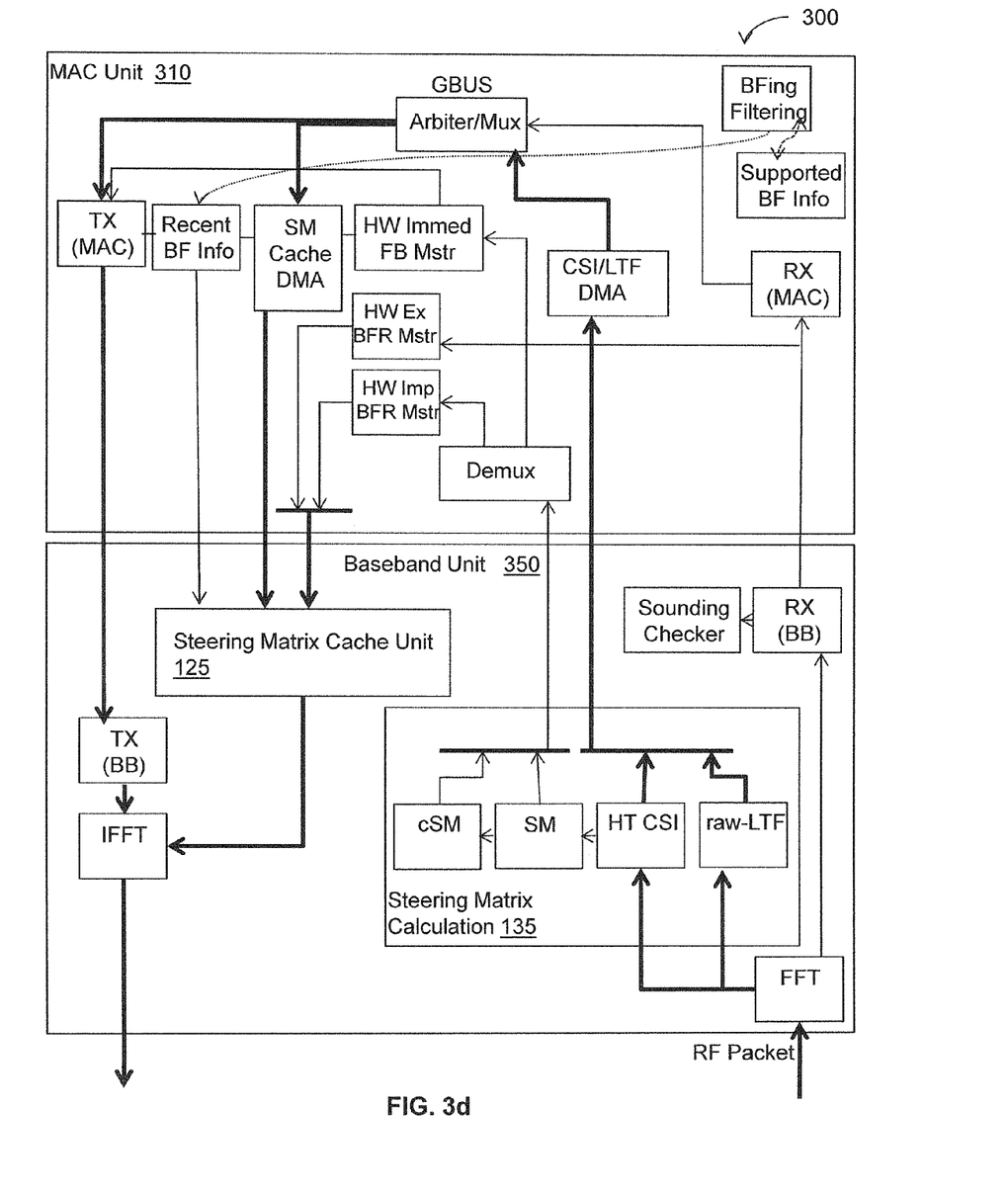

The hardware mode explicit feedback master control unit is designated "hardware mode" because the steering matrix is being calculated by components in the baseband unit 350 rather than by an external processor running software to calculate the steering matrix (see FIG. 3*d*). The hardware mode explicit feedback master control unit is designated "explicit" because the steering matrix was explicitly provided as part of the packet rather than being calculated by the steering matrix calculation logic 135. The steering matrix cache unit 125 stores the steering matrix for use in beamforming future packets transmitted to the wireless device that sent the sounding response packet.

The steering matrix cache unit 125 provides weights from the stored steering matrix to an inverse Fast Fourier Transform unit that multiplies the data in a packet being transmitted to the wireless device by the weights in the frequency domain. In one embodiment, the hybrid beamforming architecture 300 is capable of applying the weights to the very next packet transmitted to the wireless device. This "immediate steering" is enabled, in part, by the speed with which the steering matrix cache unit 125 processes steering matrices.

Figure 4:
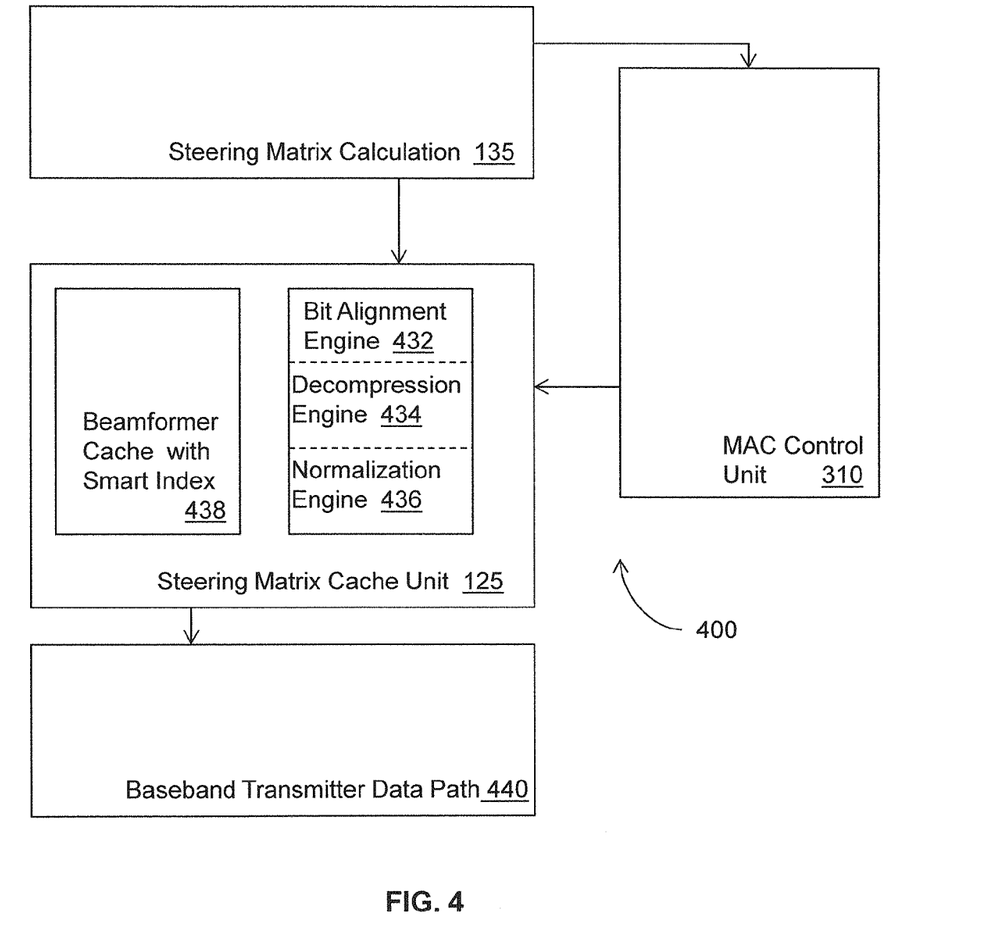
FIG. 4 illustrates one embodiment of an apparatus associated with hybrid beamforming architecture.

FIG. 4 is a functional block diagram of one embodiment of a hybrid beamforming architecture 400 that provides immediate steering of packets when operating in the beamformer mode. The hybrid beamforming architecture 400 includes the steering matrix calculation logic 135, the steering matrix cache unit 125, and the MAC unit 310 discussed above. The steering matrix cache unit 125 includes a beamformer cache with smart index 438, the operation of which is detailed with reference to FIG. 5. The steering matrix cache unit 125 receives the steering matrix from the MAC unit 310 (in this particular case, the steering matrix calculation logic 125 is bypassed) and is controlled by the MAC unit to immediately provide weights to a baseband transmitter data path 440.

To increase the speed with which the steering matrix cache unit 125 processes steering matrices, the steering matrix cache unit 125 may include one or more of a bit alignment engine 432, a decompression engine 434, and a normalization engine 436. While these components are processing the steering matrix, the MAC unit 310 may, in parallel, determine whether the wireless device is registered.

Figure 5:
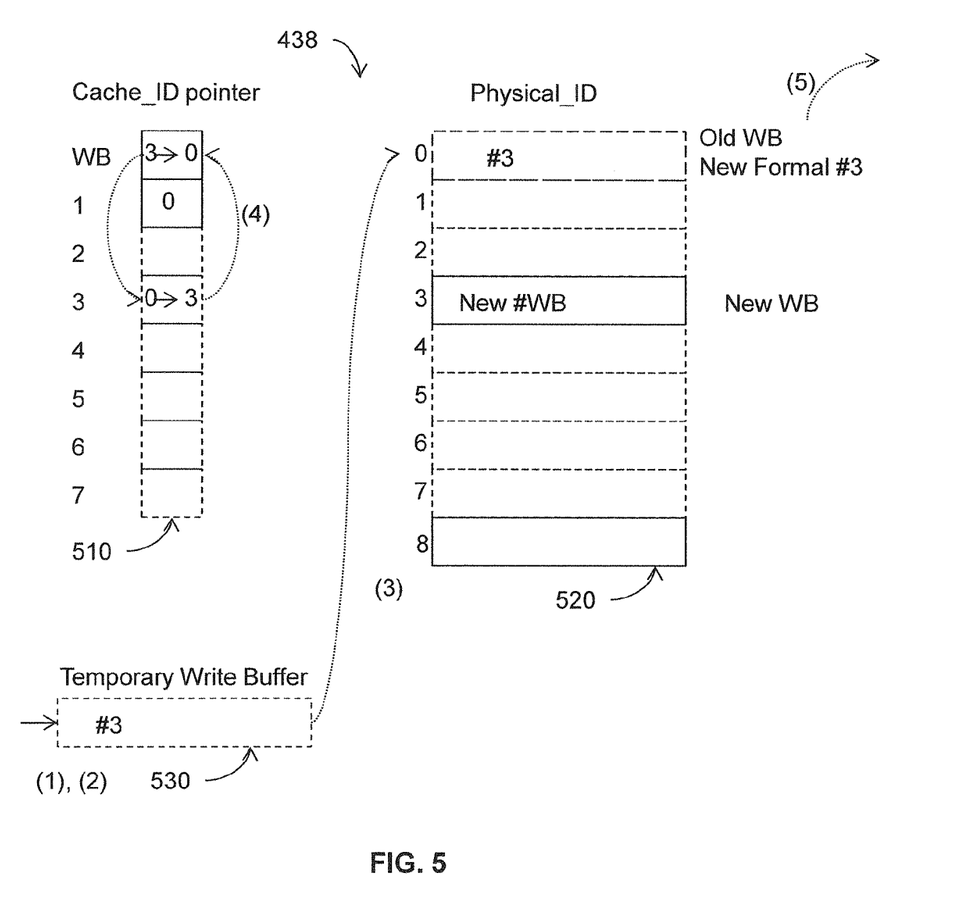
FIG. 5 illustrates one embodiment of an apparatus associated with hybrid beamforming architecture.

The beamformer cache with smart index 438 increases speed by using an index swapping mechanism outlined in FIG. 5. The beamformer cache with smart index 438 includes an index 510 that stores a cache ID pointer that points to a physical ID of memory blocks 520 that store a valid steering matrix for a given wireless device. For example, the Write Buffer (WB) pointer 510 currently points to memory block "3", which stores the current steering matrix.

A new steering matrix received from the MAC unit is written in a temporary buffer 530 as indicated by (1). The steering matrix is stored in the temporary buffer while the MAC unit validates the steering matrix (e.g., determines that the wireless device is registered, and/or that the steering matrix is in proper format) as indicated by (2). Once the steering matrix is validated, the steering matrix is written to memory block 0 that holds a prior version of the steering matrix while post processing operations (e.g., bit alignment, decompression, and/or normalization) are completed. Once post processing is complete, the MAC unit swaps the values of the pointers in the pointer block 510 so that the write buffer pointer now points to table location "0" which corresponds to the address of the newly validated steering matrix, as indicated by (4). The new steering matrix is read as indicated by (5). Revising the pointer value at the completion of the post processing gives the MAC Unit more time to validate the steering matrix and reduces the need to re-write the content of the steering matrix to a new address. This minimizes the overall latency with which weights can be ready for the next packet and, in many instances, allows the very next packet to be beamformed according to the steering matrix, thus leveraging the beamforming gain as soon as possible.

Referring now to FIG. 3c, one embodiment of the hybrid beamforming architecture operating 300 is illustrated operating in a combination mode in which the hybrid beamforming architecture 300 receives the channel information implicitly through a long training frame (LTF) in a packet preamble, calculates the steering matrix, and beamforms a subsequent transmission to the wireless device. After conversion to the frequency domain, the LTF in the packet is provided to the steering matrix calculation logic 135. Within the steering matrix calculation logic, the LTF passes to a High Throughput Channel State Information (HT CSI) unit that computes CSI information needed to compute a steering matrix. The CSI information is provided to a steering matrix (SM) unit that computes the steering matrix.

After calculation of the steering matrix within the baseband unit, the steering matrix is provided to a de-multiplexer that is part of the MAC unit 310. The de-multiplexer decodes the steering matrix for transmission to the wireless device. In some embodiments, the steering matrix is compressed with a compression engine (cSM) prior to being sent to the de-multiplexer. A hardware implicit mode feedback master control unit (HW Imp BFR Mstr) controls routing of the calculated steering matrix to the steering matrix cache unit 125. The hardware implicit mode feedback master control unit accesses the Supported BF Info that lists registered wireless devices. In one embodiment, the supported beamforming information table lists potential beamformee/beamformer clients and registers wireless devices that are validated for beamforming. If the wireless device that sent the sounding packet is not registered, the MAC unit 310 will not provide the steering matrix to the steering matrix cache unit 125. If the wireless device that sent the sounding packet is registered, the MAC unit 310 will provide the steering matrix to the steering matrix cache unit 125 for beamforming of future packets to the wireless device.

The MAC unit 310 also retrieves additional beamforming related information associated with the wireless devices that are presently engaged in beamforming with the architecture 300 that is stored in a recent beamforming information table (Recent BF Info). The beamforming related information is provided to the steering matrix cache unit 125 for use in weighting a transmitted packet.

The hardware implicit mode feedback master control unit is designated "hardware mode" because the steering matrix is being calculated by components in the baseband unit 350 rather than by an external processor running software to calculate the steering matrix (see FIG. 3d). The hardware implicit mode feedback master control unit is designated "implicit" because the channel information is provided implicitly.

The steering matrix cache unit 125 provides weights from the stored steering matrix to an inverse Fast Fourier Transform unit that multiplies the data in a packet being transmitted to the wireless device by the weights in the frequency domain. In one embodiment, the hybrid beamforming architecture 300 is capable of applying the weights to the very next packet transmitted to the wireless device. This "immediate steering" is enabled, in part, by the speed with which the steering matrix cache unit 125 processes steering matrices, as discussed above with reference to FIGS. 4 and 5.

Referring now to FIG. 3d, one embodiment of the hybrid beamforming architecture operating 300 is illustrated operating in a combination mode in which the hybrid beamforming architecture 300 receives the channel information implicitly through a long training frame (LTF) in a packet preamble, provides channel related information to an external processor that calculates the steering matrix, and beamforms a subsequent transmission to the wireless device. After conversion to the frequency domain, the LTF in the packet is provided to the steering matrix calculation logic 135. Within the steering matrix calculation logic, the LTF passes to a raw-LTF unit that simply forwards the LTF for output to a software routine. The LTF also passes to a High Throughput Channel State Information (HT CSI) unit that computes CSI information needed to compute a steering matrix. The CSI information and the LTF is provided to a CSI/LTF DMA unit that provides the CSI information and LTF on a bus that communicates them to the processor that will calculate the steering matrix. In some embodiments, the processor is part of a wireless LAN SoC that also includes the MAC unit 310 and the baseband unit 350.

After calculation of the steering matrix by the processor, the steering matrix is provided to steering matrix cache DMA that provides the steering matrix to the steering matrix cache 125. The steering matrix cache unit 125 stores the steering matrix for use in beamforming future packets transmitted to the wireless device that sent the sounding response packet. In addition, the recent beamforming information table (Recent BF Info) is updated to associate the steering matrix with the wireless device's address so that subsequent packets sent to this wireless device will use the stored steering matrix for steering. The MAC Unit 310 accesses the Supported BF Info that lists registered wireless devices. In one embodiment, the supported beamforming information table lists potential beamformee/beamformer clients and registers wireless devices that are validated for beamforming. If the wireless device that sent the sounding packet is not registered, the MAC unit 310 will not provide the steering matrix to the steering matrix cache unit 125. If the wireless device that sent the sounding packet is registered, the MAC unit 310 will provide the steering matrix to the steering matrix cache unit 125 for beamforming of future packets to the wireless device.

The MAC unit 310 also retrieves additional beamforming related information associated with the wireless devices that are presently engaged in beamforming with the architecture 300 that is stored in a recent beamforming information table (Recent BF Info). The beamforming related information is provided to the steering matrix cache unit 125 for use in weighting a transmitted packet.

The steering matrix cache unit 125 provides weights from the stored steering matrix to an inverse Fast Fourier Transform unit that multiplies the data in a packet being transmitted to the wireless device by the weights in the frequency domain. In one embodiment, the hybrid beamforming architecture 300 is capable of applying the weights to the very next packet transmitted to the wireless device. This "immediate steering" is enabled, in part, by the speed with which the steering matrix cache unit 125 processes steering matrices as discussed above with reference to FIGS. 4 and 5.

Figure 3E:
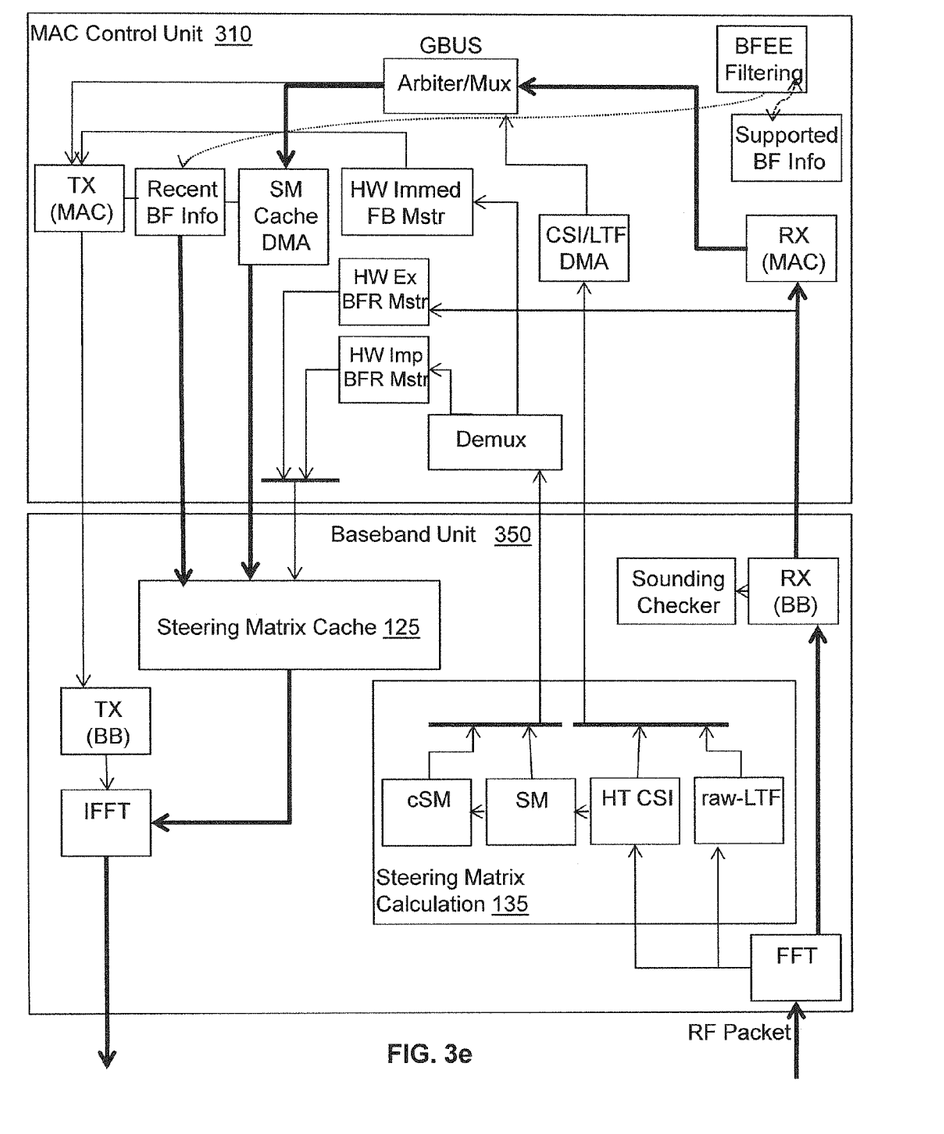

FIG. 3*e* illustrates one embodiment of the hybrid beamforming architecture operating 300 in a software mode explicit beamformer mode in which the hybrid beamforming architecture 300 receives CSI explicitly in the packet's payload, in response to a sounding packet sent by the hybrid beamforming architecture 300 to a wireless device according to IEEE 802.11n. In this mode, software is used to calculate the steering matrix from the CSI in the feedback packet's payload. The CSI is routed to the GBUS arbiter/multiplexer that communicates the CSI to the processor that will calculate the steering matrix. In some embodiments, the processor is part of a wireless LAN SoC that also includes the MAC unit 310 and the baseband unit 350. The steering matrix that is calculated by the processor is provided to the Steering Matrix Cache DMA, which controls storage of the steering matrix in the steering matrix cache unit 125.

After calculation of the steering matrix by the processor, the steering matrix is provided to steering matrix cache DMA that provides the steering matrix to the steering matrix cache 125. The steering matrix cache unit 125 stores the steering matrix for use in beamforming future packets transmitted to the wireless device that sent the sounding response packet. The MAC Unit 310 accesses the Supported BF Info that lists registered wireless devices. In one embodiment, the supported beamforming information table lists potential beamformee/beamformer clients and registers wireless devices that are validated for beamforming. If the wireless device that sent the sounding packet is not registered, the MAC unit 310 will not provide the steering matrix to the steering matrix cache unit 125. If the wireless device that sent the sounding packet is registered, the MAC unit 310 will provide the steering matrix to the steering matrix cache unit 125 for beamforming of future packets to the wireless device.

The MAC unit 310 also retrieves additional beamforming related information associated with the wireless devices that are presently engaged in beamforming with the architecture 300 that is stored in a recent beamforming information table (Recent BF Info). The beamforming related information is provided to the steering matrix cache unit 125 for use in weighting a transmitted packet.

The steering matrix cache unit 125 provides weights from the stored steering matrix to an inverse Fast Fourier Transform unit that multiplies the data in a packet being transmitted to the wireless device by the weights in the frequency domain. In one embodiment, the hybrid beamforming architecture 300 is capable of applying the weights to the very next packet transmitted to the wireless device. This "immediate steering" is enabled, in part, by the speed with which the steering matrix cache unit 125 processes steering matrices.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Logic", as used herein, includes but is not limited to hardware, firmware, instructions stored on a non-transitory medium or in execution on a machine, and/or combinations of each to perform a function(s) or an action(s), and/or to cause a function or action from another logic, method, and/or system. Logic may include a software controlled microprocessor, a discrete logic (e.g., ASIC), an analog circuit, a digital circuit, a programmed logic device, a memory device containing instructions, and so on. Logic may include one or more gates, combinations of gates, or other circuit components. Where multiple logics are described, it may be possible to incorporate the multiple logics into one physical logic. Similarly, where a single logic is described, it may be possible to distribute that single logic between multiple physical logics. One or more of the components and functions described herein may be implemented using one or more of the logic elements.

While for purposes of simplicity of explanation, illustrated methodologies are shown and described as a series of blocks. The methodologies are not limited by the order of the blocks as some blocks can occur in different orders and/or concurrently with other blocks from that shown and described.

Moreover, less than all the illustrated blocks may be used to implement an example methodology. Blocks may be combined or separated into multiple components. Furthermore, additional and/or alternative methodologies can employ additional, not illustrated blocks.

To the extent that the term "includes" or "including" is employed in the detailed description or the claims, it is intended to be inclusive in a manner similar to the term "comprising" as that term is interpreted when employed as a transitional word in a claim.

While example systems, methods, and so on have been illustrated by describing examples, and while the examples have been described in considerable detail, the disclosure is not limited to the specific details, the representative apparatus, and illustrative examples shown and described. Thus, this application is intended to embrace alterations, modifications, and variations that fall within the scope of the appended claims.

What is claimed is:

1. A first wireless device comprising:
    a transmitter;
    a baseband beamforming processing unit, wherein the baseband beamforming processing unit includes:
        a steering matrix calculation unit configured to derive a new steering matrix from channel related information in a first packet received from the second wireless device, wherein the steering matrix comprises weights; and
        a steering matrix cache, wherein the steering matrix cache includes:
            first and second write buffers configured to store steering matrices associated with wireless devices that are registered with the media access control unit as receiving beamformed transmissions; and
            an index that points to one of the first and second write buffers that stores a valid steering matrix while the new steering matrix is being written to the other of the first and second write buffers,
    wherein the transmitter is configured to, based on the weights from the steering matrix, perform transmit beamforming on a second packet being transmitted to the second wireless device from the first wireless device.

2. The first wireless device of claim 1, wherein:
    the steering matrix cache is configured to store a plurality of steering matrices respectively derived from channel related information in packets received from a plurality of wireless devices; and
    the first device further comprises a media access control unit configured to (i) identify the second wireless device and (ii) control the steering matrix cache to provide, to the transmitter, the weights from the steering matrix derived from the channel related information in the first packet received from the second wireless device.

3. The first wireless device of claim 1, wherein the media access control unit is configured to store identities of wireless devices that are registered for receiving beamformed transmissions, further wherein the media access control is configured to refrain from activating the baseband beamforming unit to perform beamforming related processing on packets received from wireless devices that are not registered.

4. The first wireless device of claim 1, wherein
    the media access control unit validates the new steering matrix and revises the index entry to point to the other of the first and second write buffers.

5. The first wireless device of claim 1, wherein the steering matrix cache comprises at least one of, a decompression engine, a bit alignment engine, and a normalization engine.

6. The first wireless device of claim 1, wherein the baseband beamforming unit further comprises a beamforming mode detection logic configured to select a beamforming mode based, at least in part, on the first packet received from the wireless device.

7. The first wireless device of claim 6, wherein the beamforming mode detection logic is configured to select beamformee mode when the first packet is a sounding packet.

8. The first wireless device of claim 6, wherein the beamforming mode detection logic is configured to select a beamformer mode when the first packet comprises payload that includes the steering matrix.

9. The first wireless device of claim 6, wherein the beamforming mode detection logic is configured to select both beamformer and beamforming mode when the first packet comprises a preamble that includes a long training frame.

10. A method, comprising:
    deriving a new steering matrix from channel related information in a first packet received from a first wireless device;
    storing the steering matrix derived from the channel related information steering matrix cache that includes
        i) first and second write buffers configured to store steering matrices associated with wireless devices that are registered as receiving beamformed transmissions, and
        ii) an index that points to one of the first and second write buffers that stores a valid steering matrix while a new steering matrix is being written to the other of the first and second write buffers; and
    providing the weights from the new steering matrix to a transmitter performing transmit beamforming on a second packet being transmitted to the first wireless device.

11. The method of claim 10, comprising:
    storing a plurality of steering matrices respectively derived from channel related information in packets received from a plurality of wireless devices;
    identifying the first wireless device; and
    providing, to the transmitter, the weights from the steering matrix derived from the channel related information in the first packet for use in beamforming the second packet.

12. The method of claim 10, further comprising:
    storing identities of wireless devices that are registered for receiving beamformed transmissions; and
    selectively performing beamforming related processing on packets received from registered wireless devices.

13. The method of claim 10, comprising:
    validating the new steering matrix; and
    revising the index entry to point to the other of the first and second write buffers.

14. The method of claim 10, wherein the steering matrix cache comprises at least one of, a decompression engine, a bit alignment engine, and a normalization engine.

15. The method of claim 10, further comprising selecting a beamforming mode based, at least in part, on the first packet received from the wireless device.

16. The method of claim 15, further comprising selecting beamformee mode when the first packet is a sounding packet.

17. The method of claim 15, further comprising selecting a beamformer mode when the first packet comprises payload that includes the steering matrix.

18. The method of claim 15, further comprising selecting both beamformer and beamforming mode when the first packet comprises a preamble that includes a long training frame.

19. An apparatus comprising:
a steering matrix calculation unit configured to derive a new steering matrix from channel related information in a first packet received from a wireless device, wherein the steering matrix comprises weights; and
a steering matrix cache, comprising:
   first and second write buffers configured to store steering matrices associated with wireless devices that are registered with the media access control unit as receiving beamformed transmissions; and
   an index that points to one of the first and second write buffers that stores a valid steering matrix while the new steering matrix is being written to the other of the first and second write buffers; and
a media access control unit configured to:
   validate the new steering matrix;
   revise the index entry to point to the other of the first and second write buffers; and
   control the steering matrix cache to provide, to a transmitter the weights from the validated new steering matrix,
wherein the transmitter is configured to, based on the weights from the steering matrix, perform transmit beamforming on a second packet being transmitted to the wireless device.

20. The apparatus of claim 19, wherein
the media access control unit is further configured to:
   store identities of a plurality of wireless devices that are registered for receiving beamformed transmissions;
   identify the wireless device from amongst the plurality of wireless devices; and
   control the steering matrix cache to select a steering matrix associated with the wireless device; and
the apparatus further comprises a beamformer unit configured to selectively perform beamforming related processing on packets received from registered wireless devices.

* * * * *